(12) United States Patent
Yu et al.

(10) Patent No.: US 8,453,491 B2
(45) Date of Patent: Jun. 4, 2013

(54) DROP TEST APPARATUS

(75) Inventors: Meng-Bin Yu, Wuhan (CN); Ming-Hui Luo, Wuhan (CN); Chang-Jun Li, Wuhan (CN); Yu-Lin Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 139 days.

(21) Appl. No.: 13/216,266

(22) Filed: Aug. 24, 2011

(65) Prior Publication Data
US 2012/0227464 A1    Sep. 13, 2012

(51) Int. Cl.
*G01N 3/00* (2006.01)
*G01D 21/00* (2006.01)

(52) U.S. Cl.
USPC .......................................... 73/12.06; 33/613

(58) Field of Classification Search
USPC ........................................................ 73/12.06
See application file for complete search history.

(56) References Cited

U.S. PATENT DOCUMENTS

| 3,224,249 | A | * | 12/1965 | Ford et al. | 73/12.06 |
| 4,910,995 | A | * | 3/1990 | Nishio | 73/12.06 |
| 6,523,391 | B1 | * | 2/2003 | Knox et al. | 73/12.06 |
| 6,892,564 | B2 | * | 5/2005 | Ishikawa | 73/12.06 |
| 7,373,800 | B2 | * | 5/2008 | Domeier | 73/9 |
| 8,240,058 | B1 | * | 8/2012 | Yu et al. | 33/613 |
| 2008/0289395 | A1 | * | 11/2008 | Torng et al. | 73/12.06 |

FOREIGN PATENT DOCUMENTS

| JP | 61147129 | * | 7/1986 |
| JP | 62263435 | * | 11/1987 |

* cited by examiner

*Primary Examiner* — Lisa Caputo
*Assistant Examiner* — Octavia D. Hollington
(74) *Attorney, Agent, or Firm* — Altis Law Group, Inc.

(57) ABSTRACT

A drop test apparatus performs a drop test on a product. The drop test apparatus includes a drop control module and a support module. The drop control module includes a bottom plate and a support beam substantially perpendicularly attached to the bottom plate. The support module is attached at a predetermined height to the support beam and includes a lever for detecting whether the product is placed in a desired position. A support panel is disposed at a first end of the lever for supporting the product. A second end of the lever is under a predetermined force for maintaining the lever in a balanced state when the product is placed in the desired position.

19 Claims, 5 Drawing Sheets

DROP TEST APPARATUS

BACKGROUND

1. Technical Field

The present disclosure relates to a drop test apparatus.

2. Description of Related Art

A typical drop test apparatus includes a drop control device and a support device. The drop control device includes a bottom panel and a vertical support beam perpendicularly attached to the bottom panel. The support device is attached to the vertical support beam. The support device includes a lever and a support panel attached to one end of the lever. A product to be tested is placed on the support panel. A predetermined force is applied to another end of the lever to keep the lever in a balanced state. The drop control device controls the support device to move away from the product. The product drops down on a platform. Then the product is examined to determine whether the product passes the drop test. If a corner of the product is placed on the support panel and the product is positioned obliquely, a gravity line of the product needs to pass the corner to meet the drop test requirement. However, the typical drop test apparatus cannot detect whether is product is placed at the appropriate oblique angle.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings, like references indicate sane or similar elements. It should be noted that references to "an" or "one" embodiment in this disclosure are not necessarily to the same embodiment, and such references mean at least one.

Figure 1:
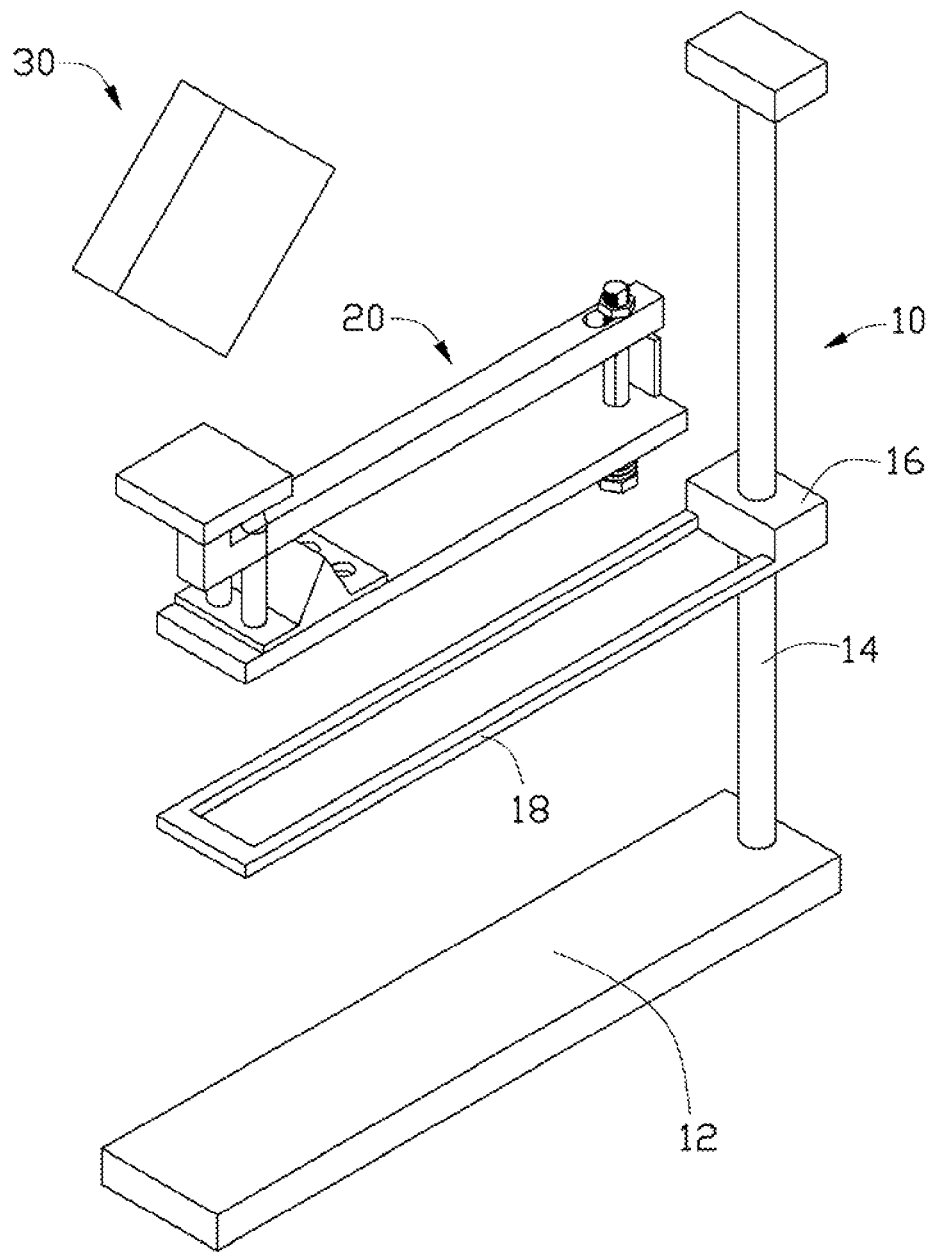
FIG. 1 is an exploded, isometric view of a drop test apparatus according to an embodiment.

Referring to FIG. 1, an embodiment of a drop test apparatus includes a drop control module 10 and a support module 20. The drop control module 10 includes a bottom plate 12 and a support beam 14 substantially perpendicularly attached to the bottom plate 12. A mounting block 16 is attached to the support beam 14 and is located at a predetermined height. A mounting frame 18 extends from the mounting block 16 along a direction that is parallel to the bottom plate 12.

Figure 2:
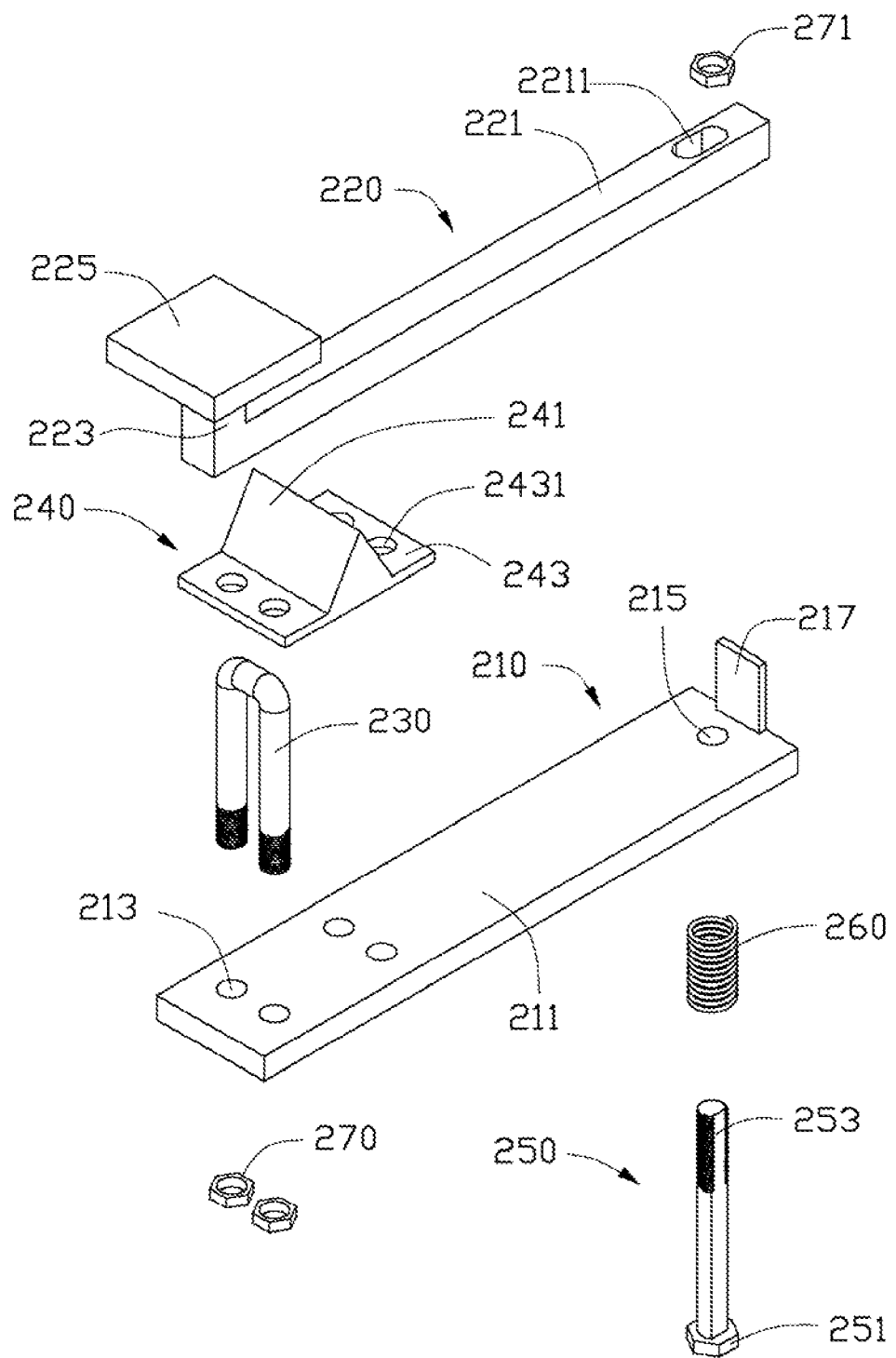
FIG. 2 is an exploded, isometric view of a support module of FIG. 1.

Referring to FIG. 2, the support module 20 includes a mounting panel 210, a lever 220, a holding member 230, a support member 240, a stud 250, a spring 260, a pair of first nuts 270, and a second nut 271. The mounting panel 210 includes a main panel 211. A plurality of mounting holes 213 is defined in the main panel 211 and adjacent to a first end of the main panel 211. A through hole 215 is defined in the main panel 211 and adjacent to a second end of the main panel 211, opposite to the first end thereof. A sensing piece 217 extends substantially perpendicularly from the second end of the main panel 211. The lever 220 includes a rod 221, a connecting post 223 substantially perpendicularly extending from a first end of the rod 221, and a support panel 225 attached on the connecting post 223. A slot 2211 is defined in the rod 221 and adjacent to a second end of the rod 221, opposite to the first end thereof. The holding member 230 has a U-shape and includes two threaded ends corresponding to the pair of first nuts 270. The support member 240 includes a base panel 243 and a triangular-prism protrusion 241 protruding from a central portion of the base panel 243. Two pairs of securing holes 2431 are defined in the base panel 243 and are located at opposite sides of the triangular-prism protrusion 241. The stud 250 includes a head 251 and an axial post 253 extending from the head 251. The axial post 253 has a threaded end corresponding to the second nut 271.

Figure 3:
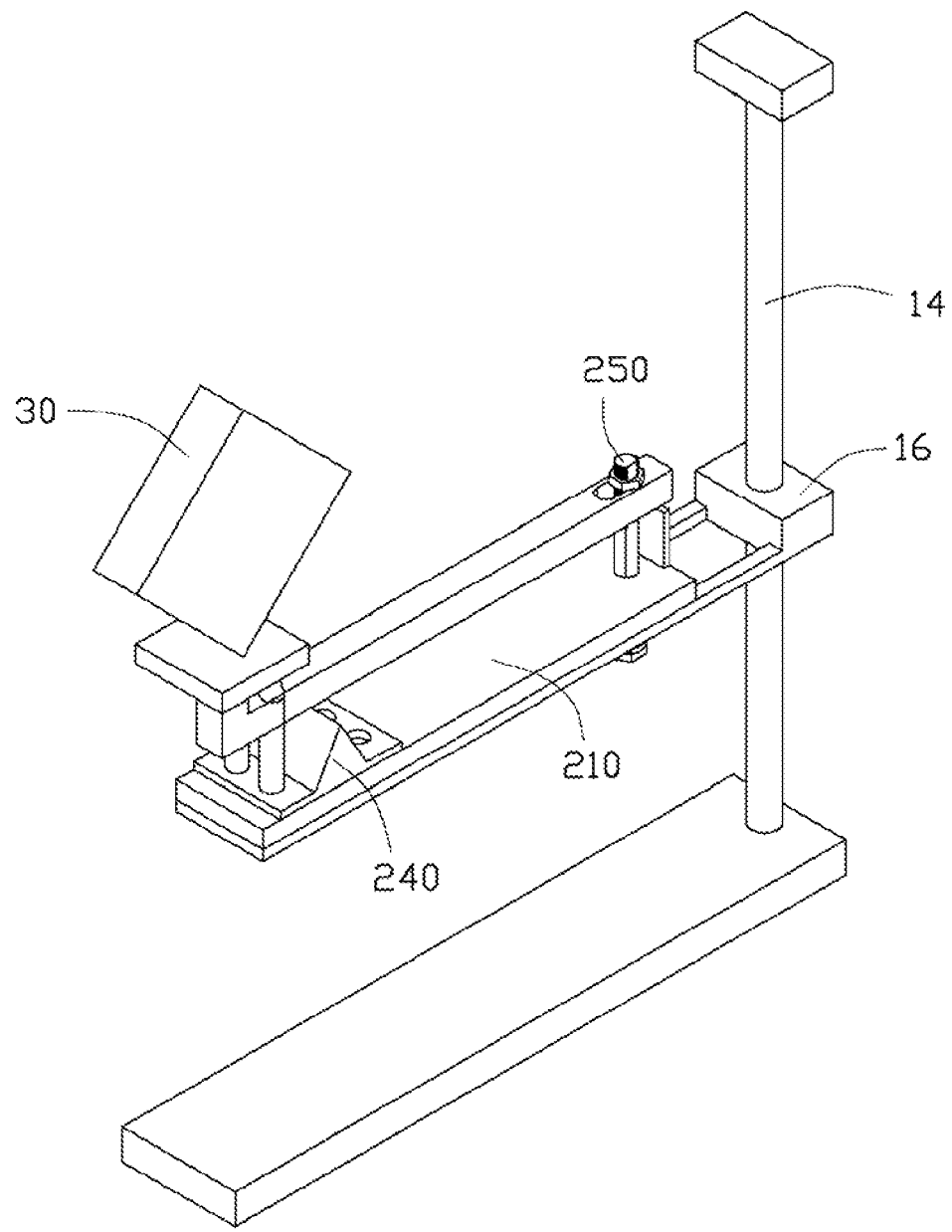
FIG. 3 is an assembled, isometric view of the drop test apparatus of FIG. 1.
Figure 4:
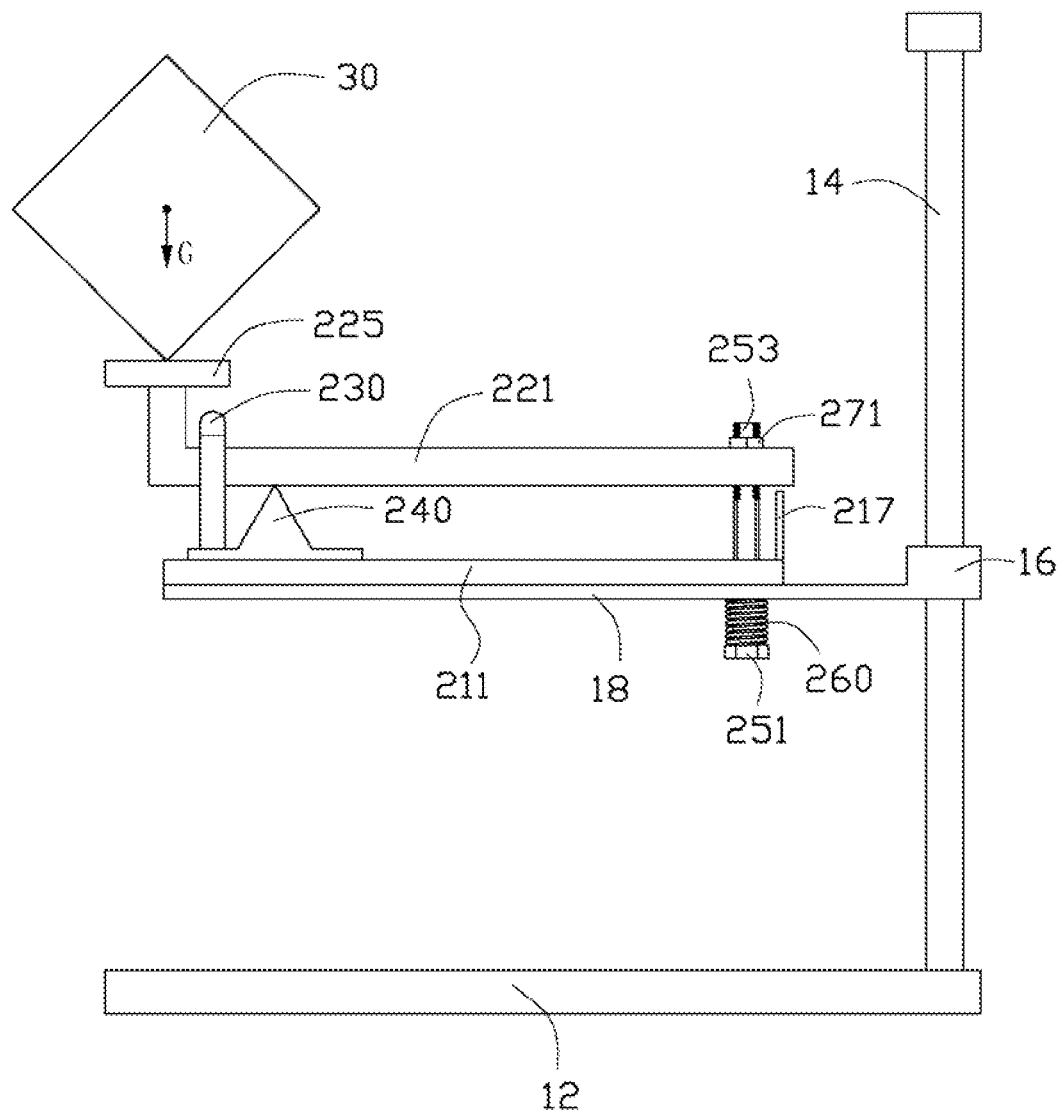
FIG. 4 is a side view of the drop test apparatus of FIG. 3, showing a product to be tested being located at a first oblique angle.
Figure 5:
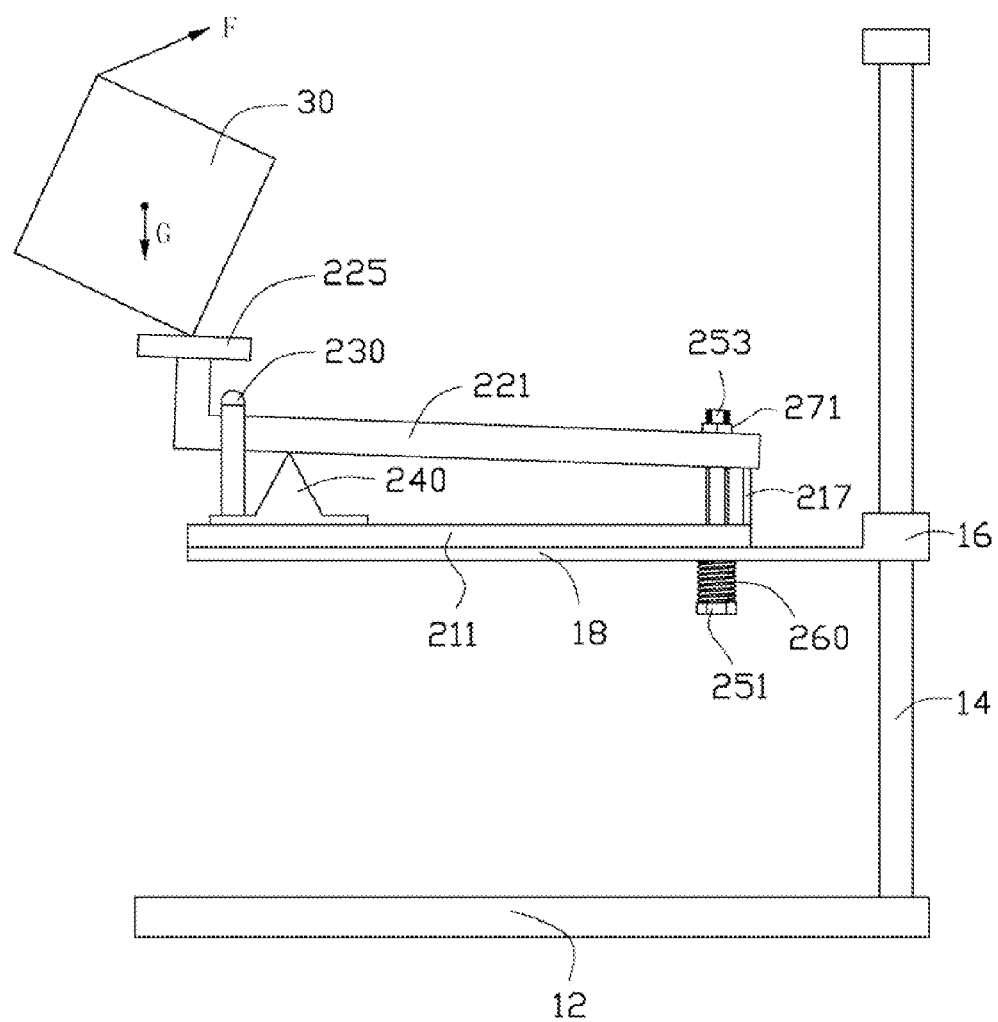
FIG. 5 is similar to FIG. 4, but showing the product to be tested being located at a second oblique angle.

Referring to FIGS. 3-5, in assembly, the securing holes 2431 are aligned with the mounting holes 213. The support member 240 is secured on the mounting panel 210. Two thread ends of the holding member 230 extend through two of the securing holes 2431 and two of the mounting holes 213 and protrude out of a back surface of the mounting panel 210. The rod 221 extends through the holding member 230 along a horizontal direction. The pair of first nuts 270 is secured to the two threaded ends of the holding member 230, thereby securing the support member 240 to the mounting panel 210. The rod 221 is placed on a top edge of the triangular-prism protrusion 241 and rotatable about the triangular-prism protrusion 241. The slot 2211 is aligned with the through hole 215. The spring 260 is attached to the axial post 253 and abuts the head 251 and the main panel 211. The axial post 253 extends through the through hole 215 and a slot 2211 and protrudes out of the rod 221. The second nut 271 is secured to the threaded end of the stud 250. The support module 20 is assembled and placed upon the mounting frame 18. A product to be tested 30 is placed on the support panel 225. A corner of the product to be tested 30 lies on the support panel 225. Thus, the corner of the product to be tested 30 can be tested to determine whether the corner can endure predetermined impact.

When the product to be tested 30 is positioned at a first oblique angle as shown in FIG. 4, a gravity line G of the product to be tested 30 passes the corner contacting the support panel 225. The product to be tested 30 can be placed on the support panel 225 without any upward force. The first end of the lever 220 is pressed by the product to be tested 30. The spring 260 is in a predetermined compressed state and exerts force to the head 251. The second nut 271 exerts a predetermined pressure to the second end of the lever 220. The lever 220 is in a balance state. Then the drop control module 10 controls the support module 20 to move quickly away from the product to be tested 30. The product to be tested 30 drops. The corner of the product to be tested 30 is examined to determine whether it can endure the impact.

When the product to be tested 30 is positioned at a second oblique angle as shown in FIG. 5, the gravity line G of the product to be tested 30 deviates the corner contacting the support panel 225. An upward slanting force F is exerted to the product to be tested 30 to prevent the product to be tested 30 from dropping. The product to be tested 30 exerts less pressure to the support panel 225 due to the upward slanting force F. The lever 220 loses its balance. The first end of the lever 220 moves upwards and abuts the holding member 230. The second end of lever 220 moves downwards and abuts the sensing piece 217. The sensing piece 217 can generate alarm signals to indicate that the product to be tested 30 is positioned at an incorrect oblique angle where the gravity line G of the product to be tested 20 deviates the corner contacting the support panel 225. Then a position of a gravity point of the product to be tested 30 should be adjusted until the lever 220 reaches its balance state to meet the test requirements.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A drop test apparatus for performing a drop test on a product, comprising:
   a drop control module comprising a bottom plate and a support beam substantially perpendicularly attached to the bottom plate;
   a support module, attached at a predetermined height to the support beam, and comprising a lever for detecting whether the product is placed in a predetermined position; a support panel disposed at a first end of the lever for supporting the product, a second end of the lever being under a predetermined force for maintaining the lever in a balance state when the product is placed in the predetermined position, wherein a U-shaped holding member is attached to a mounting panel, and the lever extends through the U-shaped holding member; the lever is spaced from the U-shaped holding member in a balance state, and abuts the U-shaped holding member in an unbalanced state.

2. The drop test apparatus of claim 1, wherein the support module further comprises the mounting panel and a support member attached on the mounting panel, and the lever is placed on the support member and rotatable about the support member.

3. The drop test apparatus of claim 2, wherein the support member comprises a base panel and a triangular-prism protrusion protruded from the base panel, and the lever is placed on a top edge of the triangular-prism protrusion.

4. The drop test apparatus of claim 3, wherein the lever comprises a rod and a connecting post substantially perpendicularly extending from a first distal end of the rod, and the support panel is attached on the connecting rod.

5. The drop test apparatus of claim 4, wherein a slot is defined in a second distal end of the rod, and a through hole is defined in the mounting panel and aligned with the slot.

6. The drop test apparatus of claim 5, wherein the support module further comprises a stud and a spring, the stud comprises a head and an axial post extending from the head, the spring is attached to the axial post and resists against the head, the axial post extends through the through hole and the slot, and a stud is secured to the axial post and resists against the lever.

7. The drop test apparatus of claim 6, wherein the spring is located between the head and a rear side of the mounting panel to exert the predetermined force to the lever.

8. The drop test apparatus of claim 2, wherein a sensing piece is disposed at the mounting panel; the lever is spaced from the sensing piece in the balance state, and abuts the sensing piece in the unbalanced state.

9. The drop test apparatus of claim 1, wherein the U-shaped holding member is in proximity to the support panel.

10. A drop test apparatus, for performing a drop test on a product, comprising:
    a drop control module comprising a bottom plate, a support beam substantially perpendicularly attached to the bottom plate, and a mounting frame attached to a predetermined height of the support beam and being parallel to the bottom plate;
    a support module, mounted on the mounting frame, and comprising a lever for detecting whether the product is placed in a predetermined position; the lever comprising a support panel at a first end of the lever for supporting the product, a second end of the support panel being under a predetermined force for maintaining the lever in a balance state when the product is placed in the predetermined position;
    wherein the drop control module is configured to move the support module away from the product when the product is placed in the predetermined position.

11. The drop test apparatus of claim 10, wherein the support module further comprises a mounting panel and a support member attached on the mounting panel, and the lever is placed on the support member and rotatable about the support member.

12. The drop test apparatus of claim 11, wherein the support member comprises a base panel and a triangular-prism protrusion protruded from the base panel, and the lever is placed on a top edge of the triangular-prism protrusion.

13. The drop test apparatus of claim 12, wherein the lever comprises a rod and a connecting post substantially perpendicularly extending from a first distal end of the rod, and the support panel is attached on the connecting rod.

14. The drop test apparatus of claim 13, wherein a slot is defined in a second distal end of the rod, and a through hole is defined in the mounting panel and aligned with the slot.

15. The drop test apparatus of claim 14, wherein the support module further comprises a stud and a spring, the stud comprises a head and an axial post extending from the head, the spring is attached to the axial post and resists against the head, the axial post extends through the through hole and the slot, and a stud is secured to the axial post and resists against the lever.

16. The drop test apparatus of claim 15, wherein the spring is located between the head and a rear side of the mounting panel to exert the predetermined force to the lever.

17. The drop test apparatus of claim 11, wherein a sensing piece is disposed at the mounting panel; the lever is spaced from the sensing piece in the balance state, and abuts the sensing piece in an unbalanced state.

18. The drop test apparatus of claim 10, wherein a U-shaped holding member is attached to the mounting panel, and the lever extends through the U-shaped holding member; the lever is spaced from the U-shaped holding member in the balance state, and abuts the U-shaped holding member is the unbalanced state.

19. The drop test apparatus of claim 18, wherein the U-shaped holding member is in proximity to the support panel.

* * * * *